(12) United States Patent
Abendroth et al.

(10) Patent No.: US 8,966,568 B2
(45) Date of Patent: Feb. 24, 2015

(54) METHOD AND DEVICE FOR DATA PROCESSING AND COMMUNICATION SYSTEM COMPRISING SUCH DEVICE

(75) Inventors: Joerg Abendroth, München (DE); Michael Marhoefer, Deisenhofen (DE); Manfred Schaefer, Forstinning (DE)

(73) Assignee: Nokia Solutions and Networks Oy, Espoo (FI)

( * ) Notice: Subject to any disclaimer, the term of this patent is extended or adjusted under 35 U.S.C. 154(b) by 909 days.

(21) Appl. No.: 12/598,954

(22) PCT Filed: Apr. 29, 2008

(86) PCT No.: PCT/EP2008/055234
§ 371 (c)(1),
(2), (4) Date: Mar. 24, 2010

(87) PCT Pub. No.: WO2008/138747
PCT Pub. Date: Nov. 20, 2008

(65) Prior Publication Data
US 2011/0131627 A1   Jun. 2, 2011

(30) Foreign Application Priority Data

May 9, 2007  (EP) .................................. 07009309

(51) Int. Cl.
G06F 17/00   (2006.01)
H04L 29/06   (2006.01)
G06F 21/41   (2013.01)

(52) U.S. Cl.
CPC ............ *H04L 63/0815* (2013.01); *G06F 21/41* (2013.01); *H04L 63/104* (2013.01)
USPC ............ 726/1; 726/4; 726/7; 726/22; 726/30

(58) Field of Classification Search
CPC ...................................................... G06F 17/00
See application file for complete search history.

(56) References Cited

U.S. PATENT DOCUMENTS

| | | | |
|---|---|---|---|
| 6,691,232 B1 * | 2/2004 | Wood et al. ....................... 726/6 |
| 7,685,626 B2 * | 3/2010 | Malcolm ........................... 726/1 |
| 2002/0119427 A1 * | 8/2002 | Brown et al. ...................... 434/1 |
| 2003/0061506 A1 * | 3/2003 | Cooper et al. ................. 713/201 |
| 2003/0226031 A1 * | 12/2003 | Proudler et al. .............. 713/200 |
| 2005/0097342 A1 * | 5/2005 | Gatto et al. ................... 713/189 |
| 2006/0236382 A1 * | 10/2006 | Hinton et al. ..................... 726/8 |
| 2006/0253707 A1 * | 11/2006 | Lapstun et al. ............... 713/176 |
| 2007/0198831 A1 * | 8/2007 | Suzuki et al. ................. 713/156 |

FOREIGN PATENT DOCUMENTS

WO   01/11845   2/2001

OTHER PUBLICATIONS

"Information Security"—NIST, Apr. 2006 http://csrc.nist.gov/publications/nistpubs/800-63/SP800-63V1_0_2.pdf.*

* cited by examiner

*Primary Examiner* — Randy Scott
(74) *Attorney, Agent, or Firm* — Squire Patton Boggs (US) LLP (57) ABSTRACT

A method and a device for data processing are provided comprising a first instance comprising at least one local trusted unit (LTU) and a local trust manager (LTM), the method comprising the step: The local trust manager provides a policy related information to the at least one local trusted unit and/or to a second instance.

21 Claims, 8 Drawing Sheets

METHOD AND DEVICE FOR DATA PROCESSING AND COMMUNICATION SYSTEM COMPRISING SUCH DEVICE

The invention relates to a method and to a device for data processing and to a communication system comprising such a device.

A user or customer wanting to exploit a particular service that may be independent from his or her actual network is confronted with numerous processes that are required for service access control (e.g., registration, network affinity, identification, authorization, payment, privacy, policy negotiation).

This repeatedly applies if the user connects to different services, each of which requiring him to fulfill individual service access prerequisites. Such services all may have own expectations on the user's trust values and its respective environment before accepting an alien user.

On the other hand, the user himself/herself may have own requirements as how services should treat his/her privacy and trust data. Expectations with regard to such privacy issues are growing on both sides, at the provider of a service as well as at the user. This is in particular relevant when it comes to high value services including or related to (significant) cash flow or exchange of valuable tokens that bear an enormous need for proven and trustworthy multi-service environments.

All this gets even more complicated if the parties involved do not know each other beforehand and in particular do not know who (reliable or not?), with what intention (malicious or not?) and with what kind of equipment (capable of viewing secure content, latest software version?) a communication partner is connecting.

In some environments, two parties need to set up a certain level of security and may not be able to, e.g., refer to a third party for trust assurance, integrity verification and/or attestation purposes.

The problem to be solved is to overcome the disadvantages as stated before and to provide an approach to enable secure interaction of at least two parties in particular even without a mandatory connection to a third party.

This problem is solved according to the features of the independent claims. Further embodiments result from the depending claims.

In order to overcome this problem, a method for data processing is provided comprising a first instance comprising at least one local trusted unit (LTU) and a local trust manager (LTM), the method comprising the following step:

The local trust manager provides a policy related information to the at least one local trusted unit and/or to a second instance.

Hence, preferably inside the first instance, the local trust manager provides, e.g. upon request from another instance of from at least one local trusted unit, a policy related information to the at least one local trusted unit.

The policy related information may be a security relevant information and may, e.g., comprise or set a level of confidence.

This approach allows the first instance to provide a level of confidence to a second instance without a necessity for the first instance or the second instance to connect to a trusted party, e.g., a third instance acting as an independent trust center or trust company. Rather, the security relevant entities of the first instance enable the first instance (the at least one local trusted unit and the local trust manager) to provide a certain level of security that may deemed sufficient for numerous transactions or negotiations to be concluded.

However, it is a particular advantage that based on such simplified "trust" between parties, it may always be a latent option for each instance to get connected to said third (trusted) party to in order confirm a level of trust as set forth so far without a trusted party being involved. As such option can be deemed omnipresent, a user's acceptance of this approach running authentication between peers only may increase.

It is also possible to increase the level of trust by connecting to the third (trusted) party compared to a trust level already provided at, e.g., the first instance.

In an embodiment, the local trust manager provides the policy related information based on a message sent by the second instance.

This may be the case if the second instance request, e.g., a policy from the first instance and expects as a response a particular policy related information that refers to the policy. Hence, the policy related information may be sent by the first instance, after the policy has been received and processed by at least on local trusted unit.

In another embodiment, the message sent by the second instance comprises a policy.

Such policy may contain information as how a response, i.e. a policy related information, has to be compiled and sent back to the second instance.

In a further embodiment, the policy related information comprises a level of confidence.

There may be several such levels of confidence, that could depend on a scenario, a business or negotiation to be concluded, a person or user, an equipment (known, unlikely to be manipulated or running malware), etc. Optional, a user or a device may decide in what level of confidence s/he trusts and hence proceeds with the transaction. As stated supra, it is also an option to request a stronger level of trust by requesting additional confirmation from at least one third party.

It is to be noted that the third party can be a generally known and trusted entity and/or a instance that may just increase the level of trust (i.e. the trusted entity may act as a verifier or issuer of, e.g., certificates, software or the like). The latter may be another peer (or several instances), each of which does not necessarily have to be a common trusted entity.

As an alternative, the trusted third party may also decrease a level of trust, e.g., in case of enforcing a revocation.

In a next embodiment, the policy related information comprises at least one of the following:
  a) A token: The token can be used to be directly forwarded, e.g., from the first instance to the second instance and/or from the local trust manager to the at least one local trusted unit. Based on the policy that is sent or forwarded the token can be compiled according to demands of, e.g., the second instance. The rules as how such token has to be compiled may be negotiated in advance or during such communication. Advantageously, the at least one local trusted unit does not need to know anything about the token or as how it is to be compiled by the local trust manager, it just forwards it upon reception to the second instance.
  b) An attribute: In principle, each kind of data can be used for the purpose described, i.e. forwarding policy relevant information to the second instance.
  c) A certificate: A certificate can be forwarded in order to prove, e.g., an identity of the first instance to the second instance.
  d) A set of claims may be used to confirm the identity of the first instance.

e) A time and/or a time stamp may be used to confirm the identity and/or to confirm a validity period.

f) A program to be run on the first instance: The information provided by the local trust manager may be a program and/or an applet that is installed or runs on the platform of the first instance. The program installed and/or running on the first instance can be used to directly communicate with the second instance according to the policy set forth.

g) Parameters of a program to be run on the first instance: It may also be a solution to only provide parameters to the first instance, said parameters are used by a program, applet of function executable on the first instance. Transferring a predefined set of at least one parameter may result in executing a particular function at the first instance.

It is to be noted that combinations thereof or with additional pieces of information can be used in order to meet the level of confidence required by, e.g., the second instance.

It is also an embodiment that the at least one local trusted unit transmits the policy related information to the second instance or to (another) third instance.

Pursuant to another embodiment, the local trust manager acts as a virtual trust provider.

According to an embodiment, the local trust manager provides policy related information to a requesting instance, e.g., to the second instance.

This may allow the first instance and the second instance to conclude a business and/or negotiation without including any third party as trusted entity.

According to another embodiment, the local trust manager derives at least one (trust) certificate. Such certificate may be derived from itself and supplied to the at least one local trusted unit. Advantageously, the certificate is based on properties provided by the local trusted unit.

In yet another embodiment, the local trust manager assigns at least one trust certificate to the at least one local trusted unit.

According to a next embodiment, the local trust manager reports a trust level of at least one local trusted unit to a requesting instance, e.g., to the second instance.

Pursuant to yet an embodiment, the local trust manager translates a parameter from the at least one local trusted unit into a trust level and/or into a token, wherein said trust level and/or token is preferably transmitted to a requesting instance, e.g., to the second instance.

In a embodiment, the local trust manager communicates online and/or offline with an external instance that provides the local trust manager with information related to at least one of the local trusted units.

Such communication may apply with an additional instance, in particular with a trusted third party, e.g., a common trust center.

It is another embodiment that the local trust manager is enabled to manage a session context of the at least one local trusted unit.

Further, it is an embodiment that the local trust manager comprises (and performs) a watchdog functionality to monitor the at least one local trusted unit.

According to yet another embodiment, the local trust manager applies external control issues to the at least one local trusted unit.

It is a next embodiment that the local trust manager comprises and/or performs a charging functionality.

As a further embodiment, the at least one local trusted unit is protected against manipulation by, e.g., certain hardware means. In particular, the local trust manager may be better protected than the at least one local trusted unit.

Further, the at least one local trusted unit may build a security and/or a trust relation based on a process and/or on a credential that is controlled and/or provided by the local trust manager.

The problem stated supra is also solved by a processor unit that is arranged and/or equipped such that the method as described may be executable on such processor unit.

Also, the problem stated above is solved by a device, in particular by a first instance, comprising:
 a local trusted unit; and
 a local trust manager;
  wherein the local trust manager is equipped to provide a policy related information to the local trust manager and/or to a second instance.

According to an embodiment, the device is a communication device, in particular a device of the following type:
 a smart card;
 a chip card;
 a user equipment;
 a user terminal;
 a mobile phone;
 a machine setup and left at a location by a user;
 a mobile computer;
 a personal digital assistant;
 a computer connected to a wired or wireless network;
 an IP telephone.

The smart card and/or the chip card may in particular obtain the energy required for its operation via Near Field Communication (NFC). Such cards may be used for ticketing, accounting applications, point of sales or the like.

It is to be noted that the wireless network may comprise Near Field Communication (NFC).

The problem stated supra is also solved by a communication system comprising the device as described herein.

The approach as presented comprises in particular a decentralized trust management that leverages ease of use and in many cases (e.g. considering near field communication (NFC), or peer-to-peer (P2P) transactions) is also applicable in absence of a "managing network"—connectivity.

In the setting of an attestation within the field of trusted computing one entity proofs another entity's trustworthiness by, e.g., use of integrity values. These values as such may be complex and may also change often. Therefore, central authorities can be used to translate an integrity value into an assertion.

However, using centralized authorities (such as, e.g., trusted common (third) parties) is convenient when building and confirming security and trust relations between entities that are initially unknown and are unacquainted of the trustworthiness of one another.

Regarding many applications as P2P, NFC or situations without any reliable connection to a network authority (i.e., trusted party), some authority functionalities may have to be shifted to the clients themselves.

Therefore, the approach provided herewith presents a solution that does not require a direct connection to a central authority. Instead, no or merely occasional interaction with such central authority may suffice.

Such occasional interaction with a central authority or trusted third party (e.g., a trust center) may be utilized online or even offline or by relying on an optional network infrastructure to be used in special circumstances only.

Further, this approach provides a high degree of flexibility as it can autonomously adapt to a wide field of applications and security/trust environments. It also solves the problem of translating "integrity values" into "trust assertions" that can be performed by a single instance only.

In a particular scenario, two instances A and B (also referred to as devices) want to communicate with each other, in particular these instances may want to exchange secret information and/or conclude a deal, enter into a contract or agree on terms of negotiations.

The Device B (Second Instance) wants to know a trust level of the Device A (First Instance). According to FIG. 1, the Device A comprises a Local Trust Manager LTM and a Local Trusted Unit LTU. The Local Trusted Unit LTU is the application that wants to communicate with the Device B.

It is to be noted that prior to issuing a certificate, an attestation may be provided.

Figure 1:
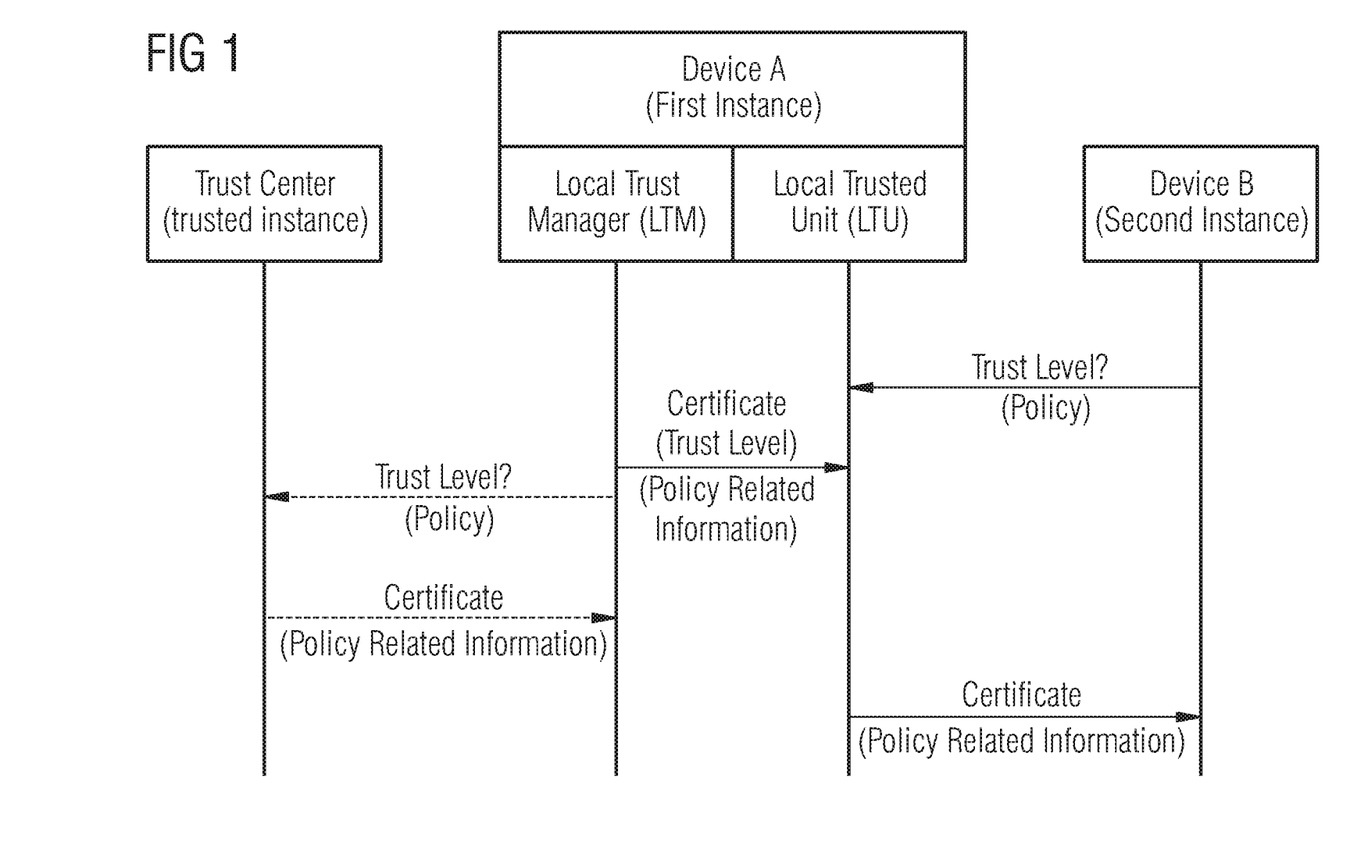
FIG. 1 shows a message chart of a scenario comprising a device A and a device B requesting and exchanging certificates—optionally by including a trusted instance.

The Device B needs to verify an integrity of the Local Trust Manager LTM at the device A, which is expressed by a known platform configuration register (PCR) and/or a hash value. Changes of this value may occur not very often. Also, the distribution of these values can be provided out of band. Hence, the Device B sends a request (comprising a policy or a level of trust required to the Local Trusted Unit LTU.

The Local Trust Manager LTM has its own database of (locally) known Local Trusted Unit LTU trust parameters, which the Local Trust Manager LTM can compare with internal attestations of the Local Trusted Unit LTU.

Subsequently, the Local Trust Manager LTM can hand over a certificate to the Local Trusted Unit LTU containing its trust level (also referred to as policy related information). The device A sends this certificate (which includes a reference to the certificate of the Local Trust Manager LTM) to the device B.

The certificate does preferably not state a native hash value, as then the Device B would need to know all potential device configurations of device A or even of any device to which it may be connected. Instead, the certificate comprises a trust level on a well known scale or a comparable semantics.

Hence, a remote network authority is not required, because the Local Trust Manager LTM acts in a role of a "Trust Provider/TrustCo" with local competences and without connection to a trust authority on the network side.

However, at least one initial phase of "setting up the Local Trust Manager LTM" and distributing its hash values may be advantageous, e.g., during a manufacturing or a deployment process of the device.

As is further shown in FIG. 1, an external instance (common Trust Center) can be present if necessary, i.e. in particular if required or requested by a party (device and/or user of the Device B). That may be the case if the Trust Level/Policy requested by the Device B is stronger than a Certificate that can be provided by the Device A only (without a trust center being involved). Hence, as indicated by the dashed lines, the trust level can be requested by the Local Trust Manager LTM from the Trust Center, the Trust Center provides an appropriate Certificate. Such Certificate issued by the Trust Center preferably is of a higher trust level and hence can be forwarded to the Device B in order to meet the request for such a high level of trust and/or security.

Figure 2:
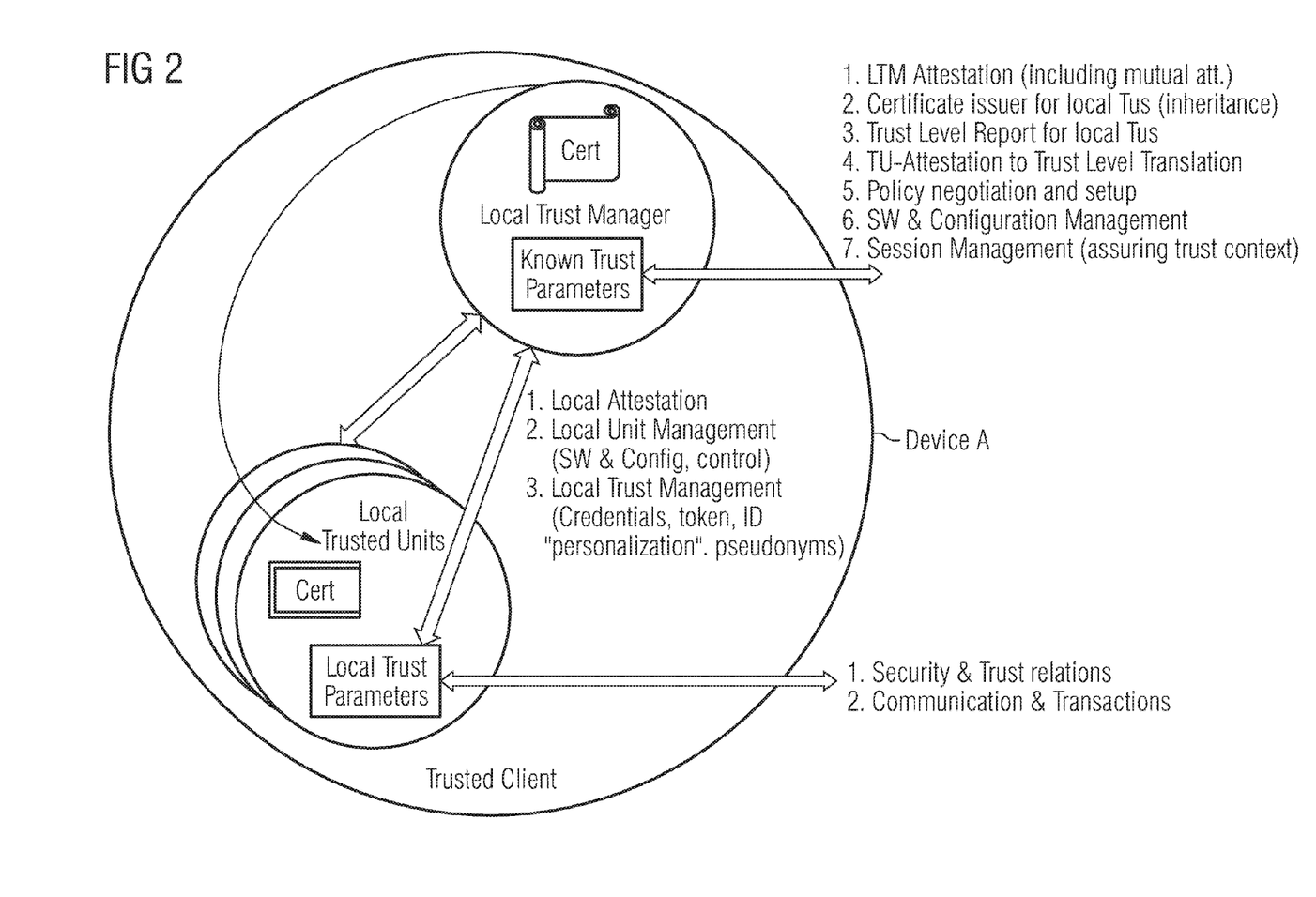
FIG. 2 shows a local trust management scenario comprising responsibilities of the participating units.

FIG. 2 introduces some principles in more detail. It describes a trusted client (here: the device A) that is implemented with pre-defined security characteristics to successfully avoid local attacks on trust-relevant data (at least to a certain extent). Such mechanisms may vary (tamper-proof, TCG based, Sandbox/Java based, UICC based, pure SW solutions, etc.) depending on respective requirements and/or environmental conditions or scenarios for which such a client is to be applied as well as depending on a level of trust that has to be met.

As local attacks cannot be categorically excluded from being (to some extent) successful, it may be advantageously to provide external control, which can be restricted to occasional and/or requested (e.g., in case of an emergency) interactions or to administrative operations (such as, e.g., managing a black list).

The Trusted Client shown in FIG. 2 comprises two particular entities, the Local Trust Manager (LTM) and at least one Local Trusted Unit (LTU).

These entities can preferably be implemented such that the Local Trust Manager LTM can affect the at least one Local Trusted Unit LTU, but not the other way round. This can be achieved, e.g., by appropriately splitting the hardware and the software of the device A, by kernel-space/user-space mechanisms, or in particular by suited built-in or attached security modules.

Local Trust Manager LTM

The Local Trust Manager LTM may take over some tasks of a virtual trust provider. However, its governance and responsibility may be restricted to the at least one Local Trusted Unit LTU of the trusted client (here: the device A).

The following tasks may be assigned to the Local Trust Manager LTM:

Local Trust Manager LTM Attestation:
  The Local Trust Manager LTM may report its integrity to an external challenger (to an external instance and/or device) that wishes to know the identity and trust parameters of the Local Trust Manager LTM.
  These trust parameters may be well known externally and may also be stored at a publicly trusted authority, such as a privacy CA. Thus, the Local Trust Manager LTM can be verified by the challenger, if required. In particular, Local Trust Manager LTM attestation can be performed between different Local Trust Managers as well as between the Local Trust Manager LTM and its at least one Local Trusted Unit LTU, if need would be.

Trust certificate issuer and verifier:
  The Local Trust Manager LTM can derive a trust certificate that contains a reference to its own trust certificate and that is assigned to at least one Local Trusted Unit LTU. Such a certificate may include trust parameters (native or in a translated way) of at least one Local Trusted Unit LTU.

The Local Trust Manager LTM can verify these certificates of the at least one Local Trusted Unit LTU, if (explicitly) requested by another party (e.g., in a P2P environment).

Once a Local Trust Manager LTM is externally known, any certificate and/or token issued by this Local Trust Manager LTM (to by at least one Local Trusted Unit LTU) can also be verified and certified.

The Local Trust Manager LTM is utilized to securely determine and report the "trust level" (or even more detailed information) of its assigned at least one Local Trusted Unit LTU. In particular, the Local Trust Manager LTM is capable of translating native trust parameters of at least one Local Trusted Unit LTU (such as hashed integrity security measurements) into specified trust levels and/or tokens having a semantic meaning such that they can be, e.g., understood by external entities.

Example: "This particular Local Trusted Unit LTU is allowed and enabled to participate in transactions up to an amount of 5 Euro." or "This particular Local Trusted Unit LTU has as a patch level of 'PL-1234'".

Hence, the Local Trust Manager LTM can communicate (online and/or offline) with an external authority (e.g., a trusted third party) that provides the Local Trust Manager LTM with information related to the at least one Local Trusted Unit LTU (e.g. specific integrity measurement values, capability-assignments or other trust parameters).

The Local Trust Manager LTM may also operate in policy negotiations and provide local policy compliant setup constraints for an assigned at least one Local Trusted Unit LTU.

Example: The Local Trust Manager LTM can derive and issue a new certificate to at least one Local Trusted Unit LTU without any external interaction. Also, the Local Trust Manager LTM may instruct the at least one Local Trusted Unit LTU to enter a particular secure state or the Local Trust Manager LTM may configure the at least one Local Trusted Unit LTU as required by a policy. However, for software management purposes, the Local Trust Manager LTM may itself require help from external management authorities.

The Local Trust Manager LTM is enabled to manage the session context of its assigned at least one Local Trusted Unit LTU.

This is particularly useful to assure that a single Local Trusted Unit LTU cannot change its specific "secure state" that it has been assigned to during an opened trusted session without being noticed. Therefore, the Local Trust Manager LTM is enabled to perform watchdog functions to monitor at least one Local Trusted Unit LTU. For example, the Local Trust Manager LTM monitors an instruction pointer (IP) of at least one Local Trusted Unit LTU being in a trusted session. If the LTU's instruction pointer due to an externally launched buffer overflow attack is set on a stack memory region, it can send a notification to external entities thereby invalidating this particular trusted session.

The Local Trust Manager LTM can also translate and enforce external control issues to the at least one Local Trusted Unit LTU.

Example: The Local Trust Manager LTM may be enabled to invalidate a certificate of at least one Local Trusted Unit LTU or it may change the configuration and/or the software setup of at least one Local Trusted Unit LTU on request of an (external) authorized entity.

The Local Trust Manager LTM may also take over responsibility for charging issues (e.g., monitoring transactions of at least one Local Trusted Unit LTU, the Local Trust Manager LTM may create and collect charging data records and report it on request).

To summarize internal tasks towards at least one Local Trusted Unit LTU, the Local Trust Manager LTM may preferably be responsible for local attestation, local unit management (concerning software and configuration, monitoring and control) as well as for trust management (e.g., credentials, secrets, token, ID "personalization", pseudonyms, activation and de-activation, registration, session control, etc.).

Local Trusted Unit LTU

The at least one Local Trusted Unit LTU is a unit that is connected either to another at least one Local Trusted Unit LTU or to services for business transactions.

The at least one Local Trusted Unit LTU is trusted in a sense that it is protected against manipulation up to a certain level that depends on a technical implementation.

In addition, any at least one Local Trusted Unit LTU
- is able to build security and trust relations and trust levels based on processes and credentials controlled by the assigned Local Trust Manager LTM (see "internal tasks" as described above);
- communicates with other partners to consume or even to offer services in a way that is convenient for a trusted device;
- is enabled for remote trust management as described above (this includes in particular secure remote software download and configuration).

Implementations and Advantages:

This approach in particular allows and/or suggests using Trusted Computing Group (TCG) compliant modules, e.g., using a trusted platform module (TPM) for the Local Trust Manager LTM and a mobile trusted module (MTM) for the at least one Local Trusted Unit LTU (mobile trusted modules allow certificate-based remote software management and they support virtualization).

The Local Trust Manager LTM relies on long-term credentials and/or trust parameters, whereas the at least one Local Trusted Unit LTU credentials and trust parameters shall preferably be temporary.

The use of the Local Trust Manager LTM also allows utilization of local pseudonyms and trust assertions that are made anonymous.

Figure 3:
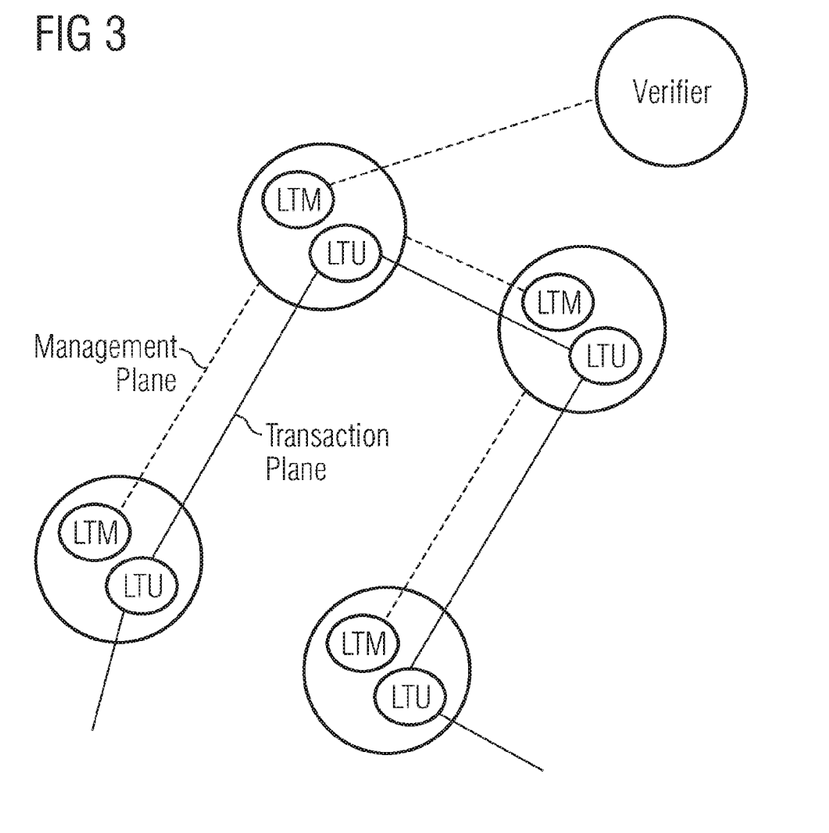
FIG. 3 shows an application scenario comprising a P2P network with security and trust relation built on local trust management.

FIG. 3 shows a typical application scenario. The client may operate in a P2P network, security and trust relations are built on local trust management.

Using the approach presented herewith, a "management plane" can be separated from a "transaction plane" as shown in FIG. 3.

The Local Trust Managers LTMs can manage the P2P network by self-organizing the security/trust setup for their peer clients (i.e. the respective at least one Local Trusted Unit LTU) that may exchange some P2P content among each other.

The Local Trust Manager LTM may secure a switching functionality of the P2P network, thus securing a "reachability" of peers that cannot be reached by the at Local Trusted Unit LTU peers themselves.

If the Local Trust Manager LTM or any of its at least one Local Trusted Unit LTU is reported to be malicious, external authorities (e.g., a verifier according to FIG. 3) can be informed.
- This may help regarding verification of Local Trust Manager LTM trust parameters and credentials, but also for re-healing purposes.
- It is also possible that external entities are used to control the P2P network via Local Trust Managers LTMs.
- The at least one Local Trusted Unit LTU—being part of a business transaction—can completely remain anonymous using trust assertions and credentials managed by the associated Local Trust Managers LTMs.

Figure 4:
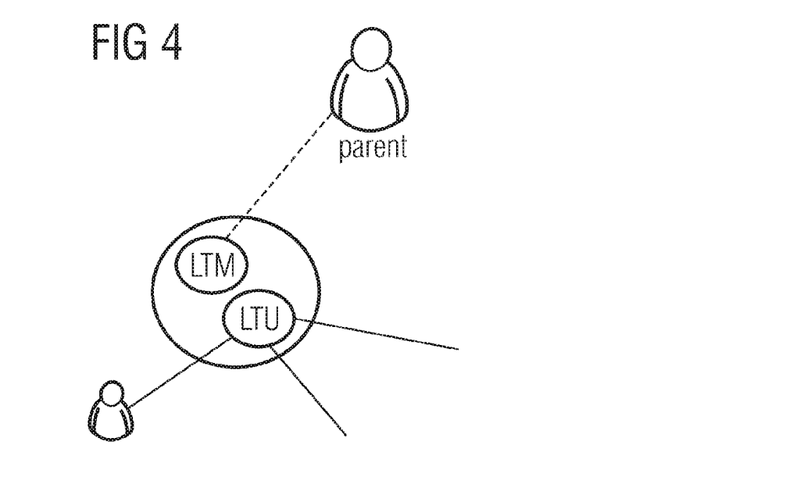
FIG. 4 shows an application of parental control mechanisms via local trust manager and local trusted unit.

One further application is a parental control functionality according to FIG. 4.
- A parent may control a child's at least one Local Trusted Unit LTU via the Local Trust Manager LTM. The Local Trust Manager LTM can assign pseudonyms, trust parameters that are made anonymous and credit limits (determined by its parents) to at least one Local Trusted Unit LTU (acting as a child) for use in restricted business transactions.
- The governance over the Local Trust Manager LTM and the at least one Local Trusted Unit LTU is done via appropriate ownership mechanisms.

A Local Trust Manager LTM can be used to implement secure measuring, monitoring, rating and device side charging (by a mobile network operator (MNO) infrastructure) functions together with local enforcement and control.
- Example: Increasingly, rating (e.g., of a seller) will be of particular interest using Internet shops. This rating is a kind of human controlled "authorization mechanism" (predominantly based on recommendations from other buyers) that is increasingly used in the field of electronic business transactions.
- Two kinds of rating functions can be supported. For example, the Local Trust Manager LTM can securely entail the owner's ratings to all Local Trusted Units LTUs and/or certificates the Local Trust Manager LTM is using in a business transaction:
  - Community confirmed P2P rating: E.g., buyers of used books are rating sellers;
  - Authority confirmed rating: Companies, institutions, services, etc. vote for the user's trustworthiness.

In machine to machine (M2M) and/or near field communication (NFC), Local Trust Managers LTMs can assure local trust even in absence of a (central) network connectivity.
- It is in particular possible that this approach is applied to an environment with sporadic connectivity to such central network via which a trusted party may be reached.
- An example for a sporadic or arbitrary connectivity is a service team that is passing by with an external verifier or control unit.

The functionality of the Local Trust Manager LTM can also perform misuse protection, e.g., in case of a stolen device.
- The Local Trust Manager LTM may autonomously invalidate the credentials of the at least one Local Trusted Unit LTU locally, if it is not re-authorized periodically or request-driven.
- For re-authorization a presence of a user and/or owner may be required. Alternatively, the user and/or owner may control such re-authorization via a notification sent to the verifier within a network or within a P2P network. Next time a Local Trust Manager LTM is connecting, an owner's authorization is requested. If such authorization fails, the at least one Local Trusted Unit LTU will be deactivated.

Network operators can get involved acting as top-level and final control authority (verifier, VTP, etc.).
- Also, the network operators (or providers) may support consumer-to-business charging in a reliable manner.
- On the other hand, the operators and/or providers may also profit from local management capabilities as this reduces network load and they can direct a portion of the network management required towards the Local Trust Manager LTM that may be in particular able of processing such task in case of missing connectivity.

The approach presented herein can also be combined with a communication scenario including a second instance and or a third instance. In particular, the second instance can request the first instance to provide a level of security and/or trust that needs to get the third instance involved.

The following describes in particular a scenario comprising a first instance that can be equipped as stated before, i.e. with a local trust manager and at least one local trusted unit.

The approach described herein in particular refers to Trust Policy Based Service Access Control (TPSAC) in an open (e.g. IP-based Internet) service environment.

Accordingly, methods enabling management, negotiation, and usage of Policy Based Trust Federation for services are described herein. This can be perceived as a supplement to methods of identity federation, thereby enabling measurable "trust" (into involved entities) and policy based negotiation and access control mechanisms.

The term "trust" in this context comprises in particular security relations between different entities that are based on "trusted devices", in particular relating to the context of the Trusted Computing Group (TCG) standardization organization.

Also, principles in relation to Trusted Network Connect (TCG-TNC) are provided. However, the approach presented herewith is in particular related to a service centric view and an open, user controlled and federated environment.

Also, this approach relates in particular to "trusted business relations" between business partners that are assured by trust mechanisms such as organizational frameworks and contracts, in particular by technical means. Technologies that allow negotiating security mechanisms are known (e.g. WS-Policy in conjunction with other Web Service technologies, privacy policies as provided by, e.g., Platform for Privacy Preferences P3P). However, such approaches lack any measured and managed "trust" issues.

The approach presented herewith in particular deals with the issue of a (Virtual) Single Point of Trust-Management. Preferably, a Single Point of Trust (SPOT) is used in order to get an all-mediating-by-one solution. Such Single Point of Trust is referred to as "virtual", because advantageously several instances may need to cooperate. However, security and privacy issues may have to be respected in a reliable manner. The virtual SPOT needs to be trustworthy to itself, due to its central responsibility in the overall trust mediation, provisioning, and management process. This can be based on contracts or technical means and accurately it may be solved by accompanying security architectures.

Issues of bilateral (or multilateral) relationships could be solved if both parties expressed their wishes in terms of policies and negotiate the conditions before granting/accepting service access. The approach provided herein advantageously presents an unified and all-covering solution thereto.

Basic trust issues concern credentials can be assigned to a user and/or to a user's device. Different solutions may need to be supported, in particular for users coming from heterogeneous networks and/or users operating with different equipment.

User equipment reliably has to be checked and, if requirements to access the service (e.g., because of non-accepted equipment, or violation of policies) are not fulfilled, trust management processes may be required.

As an example, such trust management process can check device capabilities or a command can be conveyed to the device for configuration purposes (e.g., "enable Java Script") or trust values of the device can be checked ("attestation", negotiated policies). In a more complex scenario, a trust management process can include extended remote device management (e.g., to prepare and to securely bind necessary credentials to a state of the system or to enable secure software download). Also deactivation, revocation and risk control (e.g., to prevent misuse of stolen devices) is a trust-management issue that can be taken care of.

This approach allows a service (by use of SPOT and trust federation) to utilize, e.g., Trusting Computing Group TCG (or other trust mechanism), without relying on a specific access technology.

In closed environments (e.g., in a mobile network) the mobile network operator attends to charging and billing. However, this is mostly restricted to network services and it is only supporting own (or roaming) subscribers of the respective mobile network operator (connecting via, e.g., xSIM/3GPP mobile devices).

This approach also provides a federation of trust data (i.e. integrating trusted computing mechanisms into federation principles) as well as trust management.

Furthermore, this approach may extend some TCG components, it may in particular use them in the context of a unified service access control mechanism.

Also, this approach allows to incorporate (but is not restricted to) General Authorization (GA) assertions.

Figure 5:
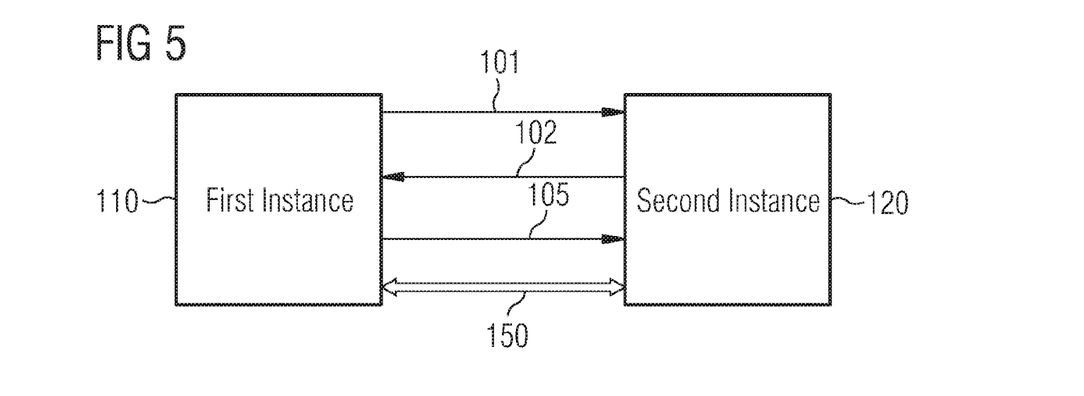
FIG. 5 shows a block diagram comprising two instances that can be used for data communication.

FIG. 5 shows a block diagram comprising two instances that can be used for data communication.

A First Instance 110 sends a request 101 to a Second Instance 120. The Second Instance 120 sends a message 102 (as a response) comprising a policy. This policy indicates, e.g., what kind of information, data, level of confidence is required from the First Instance 110 to fulfill the request 101.

The First Instance 110 then sends a policy related information 105 to the Second Instance 120 and hence meets the policy set forth by the Second Instance 120 in its message 102.

As an example, meeting the policy of the Second Instance 120 by sending the policy related information 105, the First Instance 110 authenticates itself to the Second Instance 120. Subsequently, the Second Instance 120 may fulfill the request 101 of the First Instance 110 by providing information 150. This information 150 may relate to further data communication that is exchanged bilateral.

Figure 6:
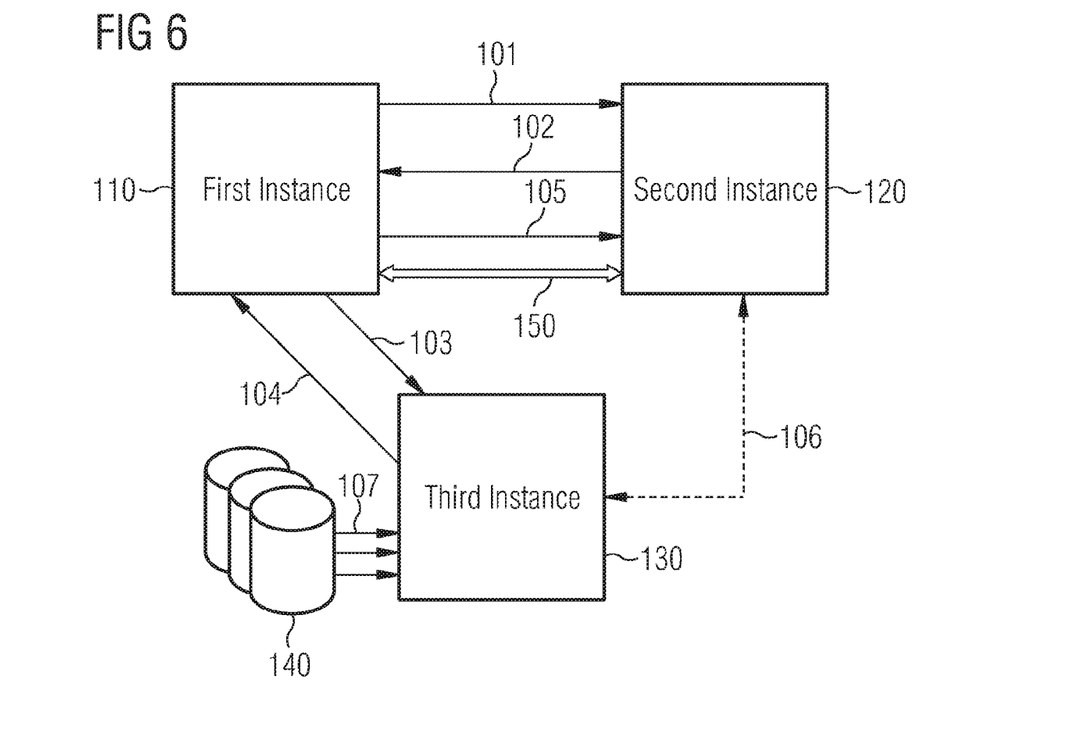
FIG. 6 shows a block diagram based on FIG. 5, wherein an additional third instance acts as a trusted party.

FIG. 6 shows the First Instance 110 and the Second Instance 120 according to FIG. 5 in addition to a Third Instance 130.

Prior to sending the policy related information 105 to the Second Instance 120, the First Instance 110 sends a request 103 that is related to the policy required by the Second Instance 120 (sent via the message 102) to the Third Instance 130.

This may in particular become necessary if the Second Instance 120 indicates via its message 102 that a level of confidence is required that cannot be met by the First Instance 110 alone (e.g., the Second Instance 120 is not going to trust the First Instance 110 only because the First Instance 110 will tell the Second Instance 120 to do so). Hence, a trusted party (here: the Third Instance 130) is required for both the First Instance 110 and the Second Instance 120.

Accordingly, the Third Instance 130 produces a policy related information 104 upon receipt of the request 103 and sends it to the First Instance 110. The First Instance 110 forwards the policy related information to the Second Instance 120 via the message 105.

The policy related information 104 generated by the Third Instance 130 can be based on information 107 provided by at least one device management server 140 to the Third Instance 130. Such information 107 can relate to the particular device of the First Instance 110, e.g., a type of a cellular phone provided by a certain manufacturer, and/or at least one application running on the First Instance 110.

Furthermore, the Second Instance 120 can provide additional information 106 that is required to generate the policy related information 104 online or offline. Such information can also be stored in separate databases.

The policy related information can provide a token, an attribute, a certificate, a set of claims, a program to be run on the First Instance 110, parameters of a program to be run on the First Instance 110, information provided by the device management server 140 and/or information provided by the Second Instance 120.

As a particular embodiment, the First Instance 110 may be a terminal, in particular a mobile phone, the Second Instance 120 may be a service provider, wherein the First Instance 110 and the Second Instance are connected via a fixed network or via a wireless network. The Third Instance 130 may be a trust company that can be connected to the First Instance 110 and/or to the Second Instance 120 via a fixed network or via a wireless network.

It is to be noted that a network application may comprise a network of limited expansion like in Near Field Communication (NFC). Such a scenario can comprise a limited number of, e.g., two to three instances.

Figure 7:
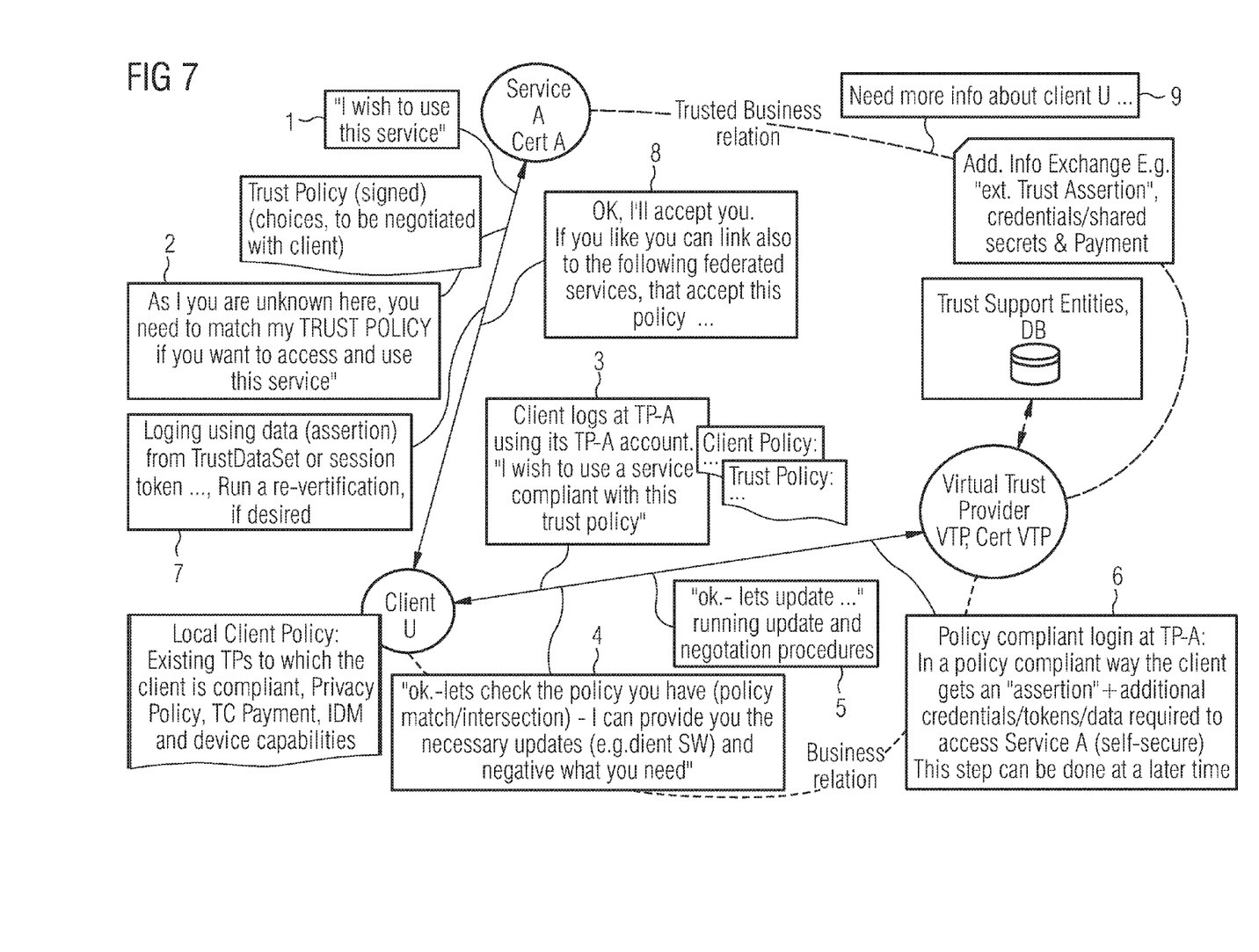
FIG. 7 shows a diagram comprising a trust provision scheme with information flow between a service, a client and a virtual trust provider.

FIG. 7 shows an access control scheme according to one embodiment presented with this approach. FIG. 7 shows how the Single Point of Trust (SPOT) is realized and that in a step 6 the client receives a token that federates the trust of different trust support entities (see FIG. 8 as described below). In the following the concepts are explained.

Assumptions

It is assumed, that a service or a provider possesses each at least one certificate (with a public key and a private key). This is used for secure messaging from the client to the server and to establish secure channels (e.g., via TLS) as well as for mutual authentication.

Connecting

A user at a Client U wishes to connect to a Service A requiring access (1) for using that Service A. The Service A may be IP based and it is open to any client that is accepted. However, in order to become accepted, several conditions have to be met.

Trust Policy

These conditions are expressed in terms of a so-called trust policy provided by the Service A after the Client U is connecting (2).

The Trust Policy is security related and should preferably be protected in a suitable manner, e.g. by a signing mechanism. The policy includes the following aspects (but is not restricted to these) that must be negotiated between the Client U and the Service A.

As an alternative, the Client U may offer an existing policy to which it is compliant and the Service A can decide whether to accept it or to start the negotiation process as set forth.

Client software required for connection
- The Service A requires software to be available and to be run on the Client U.
- This may be a security related issue (e.g. prescribing a certain runtime environment like a trusted browser and/or a trusted standard software). It may also be a service specific issue, as the Service A (or an affiliated (preferably trusted) third party) may provide a piece of (trusted) software itself (e.g. an trusted ordering, communication or payment module) for policy compliance to be run on the Client U.
- The Service A may also accept user preferences as well as alternatives thereto (e.g., a favorite browser at the Client U) if this is policy compliant.

Trust Level (TL)
- The Service A provides information of the level of trust associated with a level of confidence that is expected from the Client U.
- This may include configuration of the client, active client state during service communication, security capabilities, patch level of the client software, presence of local Intrusion Detection/Prevention (IDS/IDP) tools running at the client, or other client capabilities that do not need to be directly trust relevant itself (e.g., enabled protocols, CPU speed, QoS parameters). However such capabilities are preferably revisable and they should be reported in a trusted manner.
- The trust level can be a predefined value (e.g., known by the trust provider or any other trusted external entity). It may also be described by a trust level specification.

Trust Level (TL) Specification
- A trust level specification can be provided in a formalized and/or exchangeable manner, e.g., using an extensible markup language (XML).
- Using trusted computing mechanisms may comprise pre-conditions (Remote Integrity Measurement Certificates (RIM-Cert) values describing expected software to be loaded into a device) and post-conditions (e.g., Integrity Measurement Values (IMV)) that may securely be reported by the Client U when being checked for allowance to the Service A.

Time Synchronization, Time Stamps
- The Trust Policy may require specifications regarding trustworthiness or synchronization of the local time running at the Client U during its connection with the Service A.
- Also, behavioral requirements can be expressed, e.g., a requirement to use time stamps when exchanging messages with the Service A.

Accept mode
- Upon connection, the Client U may be directly accepted by the Service A. This case is of relevance when using trusted computing mechanisms. In accordance with the accept mode the Service A can specify the mechanisms to be used when connecting, e.g., Attestation, REL-token, re-verification, certificates, validity periods, sealed-credentials, token, shared secret, etc.
- In principle, there are several alternatives:
  a) The Client U is prepared and already checked by another instance, e.g., a Virtual Trust Provider VTP, thereby equipping the Client U with suitable tokens, certificates or credentials that have to be forwarded to the Service A when connecting.

The Service A trusts the credentials or information generated by the Virtual Trust Provider VTP, but it may also ask the Virtual Trust Provider VTP for further detail or additional verification.

b) The Service A itself checks the Client U upon connection. Such inspection may be advantageously prepared by the Virtual Trust Provider VTP (e.g., via remote device management).

Moreover, the Virtual Trust Provider VTP may support verification (e.g., provide the expected verification values) to leverage TCG based mechanisms.

ID type
- The Service A may set ID type(s) that the Client U has to provide during authentication and/or attestation (Examples: device ID, user ID, used of anonymity and of pseudonyms, AIKs).

Authentication mode
- The Service A may specify as how the client has to be authenticated at the Virtual Trust Provider VTP for service access preparation (3GPP network/xSIM, using Generic Authentication Architecture GAA, using TCG attestation, RIM GA/AIK, Web, Certificate, password, etc.)

Charging and payment mode
- The Service A specifies as how charging and payment should be considered. This allows setting up a respective payment scheme for the Client U using the Service A.

Privacy
- Platform for Privacy Preferences P3P related issues can also be covered.

Authorization
- If the Service A needs authorizations (e.g. specific rights to access the Client U and/or payment guarantees from the Client U it can be specified what kind of information to be used and as how to implement the authorization mechanism (e.g., using REL-Token, using service specific mechanisms, using XACML technology, etc.). Also contracts or negotiation terms may be subject to a policy.

Local Client Policy

The Client U may have its own (local) policies (there can be different ones, e.g., depending on a system state) that may match the issues related to server policies and extensions that are user or client specific.

In particular, such extensions may cover device capabilities (security, trust, protocols, etc.), user privacy (use of anonymity) and federation attributes (which attributes are enabled for federation, and which are not).

Policy Negotiation and Resolution

The access control mechanisms to be applied can be negotiated between the involved business partners using "trust and privacy policies" expressing their respective expectations that may be measured and managed by specialized entities via the Virtual Trust Provider VTP.

After sending the policy to the Client U, the Client U connects to the Virtual Trust Provider VTP (a selection of the Virtual Trust Provider VTP may be chosen by the Client U) for policy negotiations and preparations (3).

At the Virtual Trust Provider VTP, the Client U is known, a business relationship between the Virtual Trust Provider VTP and the Client U had preferably established before such connection. Such a business relationship may be based on, e.g., a contract and an initial subscription that allows the Client U to be authenticated by the Virtual Trust Provider VTP.

As described above, the Client U may have its own local policy to express its own level of confidence required (e.g., a user privacy of the Client U). Such local policy of the Client U may also comprise capabilities of enablement and/or compatibilities and/or compliances. The local policy of the Client U may be sent to the Virtual Trust Provider VTP together with the policy of the Service A.

Next, the Virtual Trust Provider VTP checks, if the different policies (of the Service A as well as of the Client U) can be matched and/or combined (4). The Virtual Trust Provider VTP also decides what to do if there is no match. One solution to solve such mismatch is an update of the Client U via remote management. Alternatively, or in addition the Virtual Trust Provider VTP may communicate with the Service A in order to find an appropriate solution of said mismatch.

As a further alternative, the Service A can be updated to be compliant with the negotiated policy.

If necessary, the Virtual Trust Provider VTP can initiate and operate remote device management procedures (5) to make the device policy compliant. This step may preferably be based on trusted computing mechanisms. Also, such security mechanisms negotiated for the Service A can be set up in this step (5), i.e. token, certificates, binding and sealing mechanisms, security pre-requisites, etc. may be determined.

The Virtual Trust Provider VTP supplies the Client U with a set of assertions, tokens or the like that meets the policy as set forth by and/or (to be) negotiated with the Service A.

Authentication, Client Checking and Setup

In the next step (6) that may be delayed or processed repeatedly, the Client U connects to the Virtual Trust Provider VTP under conditions (using the resulting policy) that have been negotiated for service access (by the Service A according to the example of shown in FIG. 7; however, any other service trust policy could be subject to this phase).

The Client U obtains an assertion as a proof for successful identification, authentication and/or attestation (and other security checks that may be deemed necessary for authorization).

As an alternative, depending on a model of the Virtual Trust Provider VTP and depending on a (business) relationship between the Virtual Trust Provider VTP and the Client U, the Virtual Trust Provider VTP may equip the Client U with authorizations that can be transported via a REL token or implicitly via artefact/assertion mechanisms. If necessary, the Service A can (directly) contact the Virtual Trust Provider VTP.

Service Access

Once equipped with all mechanisms and credentials and assertions/artefacts, the Client U can connect to the Service A in a step (7) according to the trust policy set forth by the Service A and/or the Client U.

The Service A may accept the Client U subsequent to a step (8). Such acceptance, however, may be subject to further checks. If the Client U provides an identity (pseudonym) generated by the Virtual Trust Provider VTP (to which the Client U has a registered account) it is up to the Service A to use this identity directly or to generate its own Identity Management (IDM) based on IDs and/or data generated and provided by the Virtual Trust Provider VTP (e.g., if there is a need to associate a delivery address for sold commodities or if the service wants to store the "payment behavior" of that identity).

Another issue for information exchanged between the Service A and the Virtual Trust Provider VTP can be summarized as follows: If an "hostile" user with a pseudonym requests another pseudonym for the same Service A, because its old account has been blocked, the Service A should be informed by the Virtual Trust Provider VTP comprising a message like: "User_1123 is now USER_XYV").

If the Client U is federated to other services it is up to this client's policy to decide whether to use the same or different IDs for each of these services.

It is also possible that the service access is completely anonymous. In this case, the Service A is confiding in the "assertion" alone (which is, e.g., particularly useful for one-time-transactions like, e.g., "This anonymous user has won a competition—please give him goods worth 20 EUR—I'll guarantee for the payment."—expressed by a REL-token sent within an assertion by the Service A).

It is up to the Service A to further accept this Client U only upon a preceding Virtual Trust Provider VTP check or to run an own login procedure with that Client U using its known IDs and trust values.

Example: In cases when subsequent to an initial xSIM based registration via the Virtual Trust Provider VTP only ID and PW are required, this kind of simplified login is feasible. If the Virtual Trust Provider VTP is needed for remote device management, e.g., for time synchronization purposes or for short-term credentials, the simplified login as stated before is not feasible.

Trust Data Set, Including Assertions for Service Access

The Virtual Trust Provider VTP (after checking the Client U) provides assertion, trust data and credentials needed for accessing the Service A by said Client U. The information provided by the Virtual Trust Provider VTP refers in particular to values and may comprise at least one of the following:

Session Token:
value signed by the Virtual Trust Provider VTP, comprising in particular a validity period;
The Session Token may always exist. It confirms that the signing Virtual Trust Provider VTP checked this Client U for service access and that there exists a policy compliant Trust Data Set. The session token may in particular be associated with an inherent use by time and date.

Trust Handle:
shared secret, referring to a subsequent data set at the Virtual Trust Provider VTP and at the Client U;
The Trust Handle may always exist. It is a shared secret between Client U and the Virtual Trust Provider VTP, used to uniquely identify the data set.

(pseudonym) User-ID;
(pseudonym) Device-ID;

Assertions or assertion-handles:
transporting or referencing the "trust statement" confirmed by the Virtual Trust Provider VTP;

Credentials/Secrets (including value tokens);
Negotiated Policy;
Other data
such as time synchronization information or time stamps, credit limits, hints from the Virtual Trust Provider VTP concerning the specific service (also the Virtual Trust Provider VTP could send references to policy compliant services);

Information Exchange Between the Service A and the Virtual Trust Provider VTP

The Service A is free to contact the Virtual Trust Provider VTP to get further information concerning, e.g., policy negotiation, assertion or any other additional information exchange between the Virtual Trust Provider VTP and the Service A (9). This includes trust information (such as Integrity Measurement Values (IMVs) if the Trust Policy required re-attestation at connect time, time synchronization values, credentials and shared secrets, federation data or payment/charging information).

In addition, information regarding possible security breaches, black listed clients, revocations etc. can be requested from the Virtual Trust Provider VTP. Underlying protocols need to ensure that the Virtual Trust Provider VTP itself does not become aware of the secrets that are shared between the Client U and the Service A only.

Charging and Payment

Before, during (prepaid) or after (postpaid) the Service A is used by the Client U, this Service A can make use of the Virtual Trust Provider VTP for payment/charging support (9).

In this regard, the Service A can send charging records to the Virtual Trust Provider VTP that may forward it to the Mobile Network Provider or to any payment provider of the user's choice.

Payment modalities may also depend on the authorization the Client U obtained during the "Authentication, Client Checking and Setup" phase. For example, a REL token could transport a confirmed accounting information, stating "this Client U may consume services amounting to 5 EUR". Such accounting information can also be part of an assertion exchanged between the Virtual Trust Provider VTP and the Service A.

Trust Support Entities and Databases

The Virtual Trust Provider VTP is referenced as "virtual", in particular because it technically acts as a Single-Point-of-Trust-Management (see above) for both, the Service A as well as the Client U.

The Virtual Trust Provider VTP may comprise and/or interact with several entities that are involved in policy based trust provisioning, privacy negotiation, charging and payment processes.

Entities that particularly relevant in this regard are
(Mobile) Network Operators (to support an initial authentication derived from a successful network access, e.g., via xSIM, GAA, SSC or IMS or via a fixed network);
certification authorities for certificate/PKI support (e.g., RIM authorization certificates and RIM certificates);
TCG support entities (providing TCG compliant mechanisms and information to integrate trusted computing mechanisms, RIM enabled software);
Platform for Privacy Preferences (P3P) for privacy policy support;
Certificates (CERTs) for device and software vulnerability support, charging and payment providers;
other (associated) Virtual Trust Providers (VTPs) (e.g., in roaming or cross domain scenarios).

Figure 8:
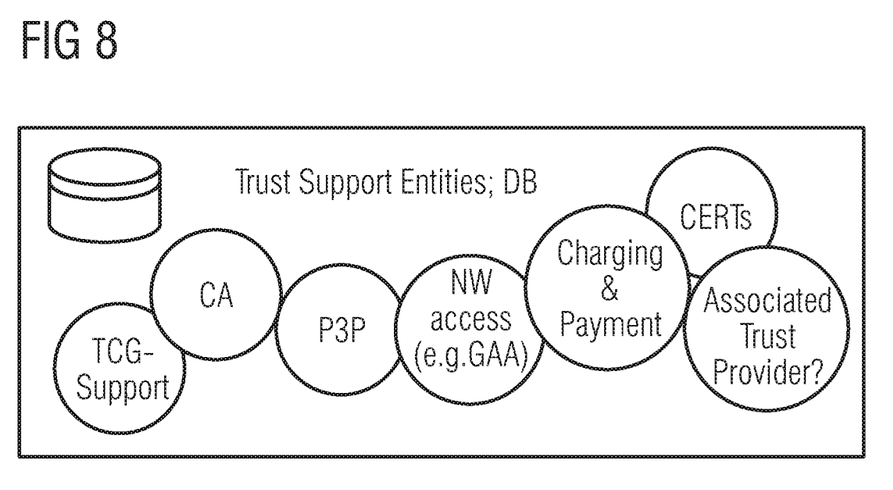
FIG. 8 shows a chart comprising trust support entities.

Reference is made to FIG. 8 for further illustration purposes in this regard.

Trust Federation

The policy based service access control scheme shown in FIG. 7 can be extended by trust federation mechanisms as indicated. There are different ways to accomplish a result as principles to be applied preferably depend on user preferences and policies negotiated with federated services.

Figure 9:
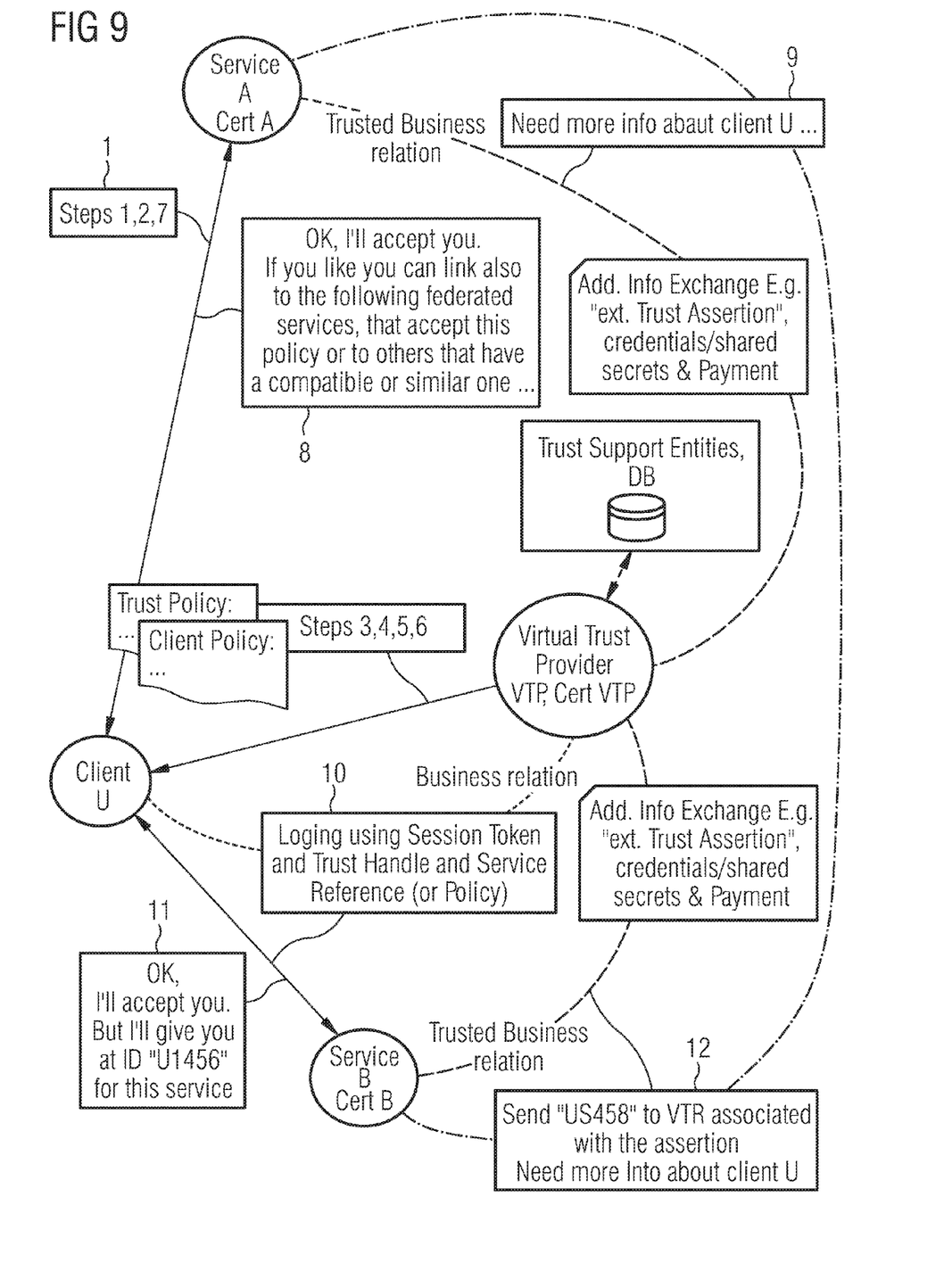
FIG. 9 shows a diagram based on FIG. 7 comprising an additional service leading as an example of a trust federation.
Figure 10:
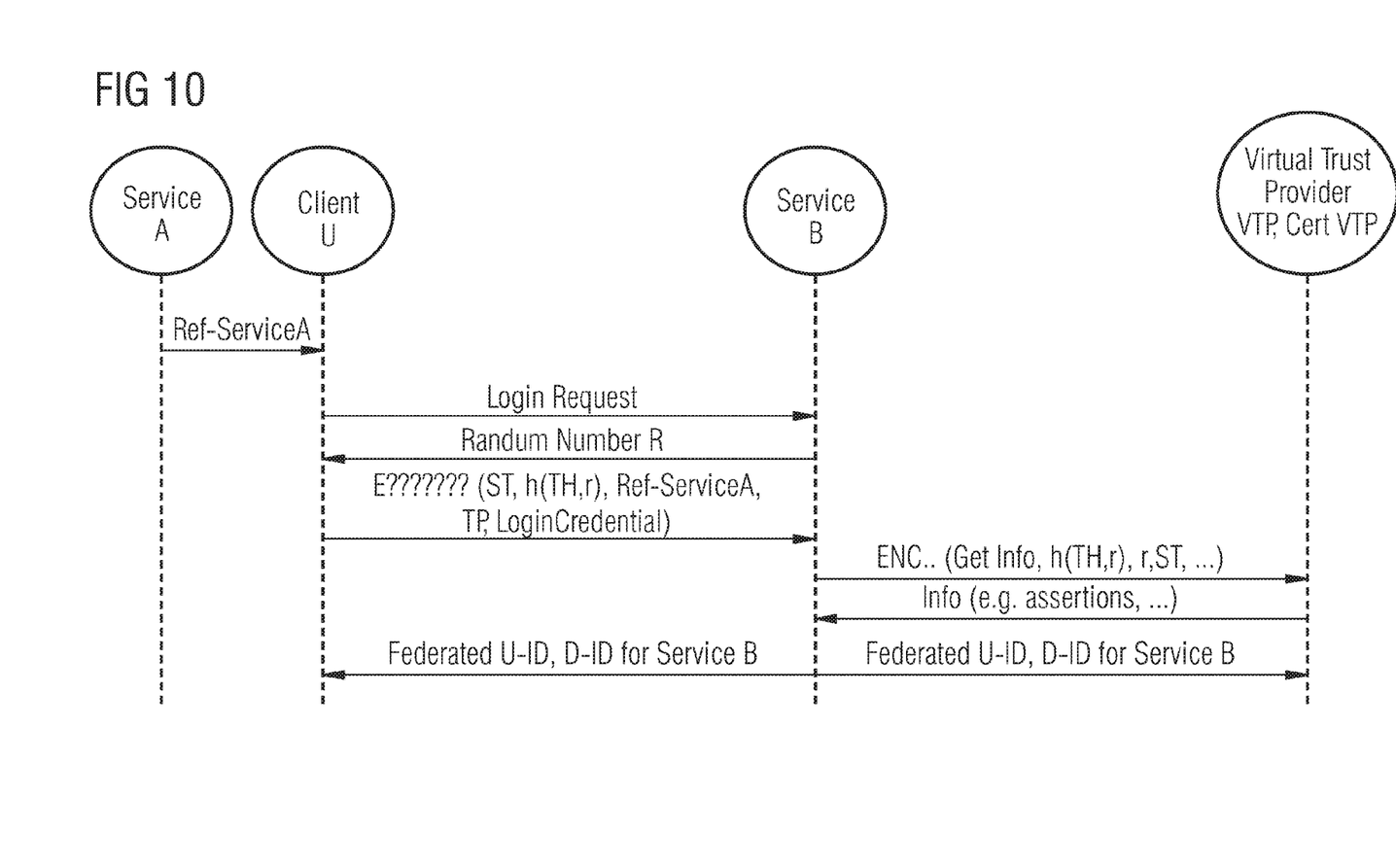
FIG. 10 shows a message chart comprising two services, a client and a virtual trust provider building a trust federation, wherein messages are sent to authenticate the user over the second service with the help of the first service.

One scheme of trust federation is shown in FIG. 9 and in FIG. 10.

After being accepted by the Service A, the Client U is linked to a Service B. In this example, the Client U does not want its VTP-ID to be shared with the Service B and hence Client U only shows Service B its reference to Service A (privacy: optional signed token from Service A), the resulting Trust Policy TP, the Session Token ST, as well as the hashed Trust Handle TH. This is visualized in step (10) of FIG. 9.

The login at the Service B can be done as described by the following message sequence:

$Enc_{pubK-B}$ (ST, h(TH,r), Ref-ServiceA, TP, LoginCredentials)

Subsequently, the Service B knows, that the Client U is confirmed by the Service A, has an accepted Trust Policy (that the Service B can re-check) and that all the conditions given in the Trust Policy have already been checked by the Virtual Trust Provider VTP. "Ref-ServiceA" can contain any data from the Service A (e.g., a recommendation, value points, daily credit limits, etc.), but it may in particular be data that is comprehensible to the Client U (e.g., for privacy policy checks).

The Service B trusts these simplified login procedure, but may optionally directly ask the Virtual Trust Provider VTP for additional information (as far as this is allowed by the privacy policy). As described above, the Client U can get an identity/pseudonym that is specific for the Service B. This is also sent to the Virtual Trust Provider VTP to prevent possible misuse by multiplied IDs (that may be used for by-passing black lists).

Example: Anonymous Payment Via "Service Invoked Home-Banking"

A service accepting a user (under a pseudonym or anonymously) has a contract with this user's bank. However, the service does not know the user's real identity, e.g., its name.

For payment purposes, the user federates his service ID and his trust data directly to his bank and obtains a prefilled form that is linked to the user's bank account (the effect is similar to home-banking directly triggered by a service payment function). The payment itself is done via an anonymous account held by the bank with a reference to the user's service pseudonym (the Virtual Trust Provider VTP helps for ID resolution) together with a confirmation that the real user's account now has been charged.

The service cannot discover the identity of the user. In addition, the bank does not know what this user (who is known there) has bought. The trust data helps to secure this kind of transaction.

The approach provided herewith combines several methods and infrastructures in a unified approach. This allows a service/user-controlled integration of network-agnostic access control, trusted computing mechanisms, federation and privacy principles, unified policy negotiation, remote device management, and trust federation, based on user and device IDs.

The following advantages are in particular apparent:
The mechanisms and roles described (e.g., Virtual Trust Provider VTP, trust support entities) enable innovative business models for so called Trust Companies (Trust-Cos).
An integration of trust values and/or tokens in a (business) process and/or negotiation between parties (instances) is supported, thereby allowing to integrate charging and payment.
By trust management an integration of (mobile) network operators and service providers (e.g. by integrating payment/charging) is supported. Also, risk management, e.g. in case of stolen or abused devices, is enhanced.
This approach leverages, generalizes and enhances service access control, making it independent from underlying network dependent mechanisms (network agnostic).
An introduced "Trust Data Set" extends and complements "assertions" containing only authorization and authentication information in a more generalized view with regard to "trust". Hence, trusted computing and device related issues (device integrity, device IDs) can be combined with a federation context.

The mechanism introduced relies on message exchange or on tokens and can be implemented fairly independent from specific protocols (e.g., HTTP).

By Trust Policy negotiation this approach allows a service emphasized compliance of access control conditions and at same time it respects user preferences, privacy, and device capabilities.

This approach further provides SSO mechanisms for trust aware services.

Furthermore, service composition is supported, as a connected service can be federated and can use a trusted SSO with the same Trust Policy.

Unified use of policies is an issue that is also solved by the access mechanisms introduced herewith.

We claim:

1. A method implemented by a first instance comprising a processor, at least one local trusted unit and a local trust manager, the method comprising:
   receiving a request from a second instance, the request comprising a policy or a required level of trust;
   translating a parameter of the at least one local trusted unit into a trust level for the at least one local trusted unit; and
   providing, by the local trust manager, policy related information including the trust level, to the at least one local trusted unit and to the second instance from which the request was received.

2. The method according to claim 1, wherein the local trust manager provides the policy related information in response to the request received from the second instance.

3. The method according to claim 1, wherein the policy related information comprises at least one of the following:
   a token;
   an attribute;
   a certificate;
   a set of claims;
   a time, in particular a time stamp;
   a program to be run on the first instance;
   parameters of a program to be run on the first instance.

4. The method according to claim 1, wherein the at least one local trusted unit transmits the policy related information to the second instance or to a third instance.

5. The method according to claim 1, wherein the local trust manager acts as a virtual trust provider (VTP).

6. The method according to claim 1, wherein the local trust manager provides policy related information to a requesting instance.

7. The method according to claim 1, wherein the local trust manager derives at least one trust certificate.

8. The method according to claim 7, wherein the local trust manager assigns at least one trust certificate to the at least one local trusted unit.

9. The method according to claim 1, wherein the local trust manager reports a trust level of at least one local trusted unit to a requesting instance.

10. The method according to claim 1, wherein the local trust manager translates the parameter from the at least one local trusted unit into a token to be transmitted to a requesting instance.

11. The method according to claim 1, wherein the local trust manager communicates online and/or offline with an external instance that provides the local trust manager with information related to at least one of the local trusted units.

12. The method according to claim 1, wherein the local trust manager is enabled to manage a session context of the at least one local trusted unit.

13. The method according to claim 1, wherein the local trust manager performs a watchdog functionality to monitor the at least one local trusted unit.

14. The method according to claim 1, wherein the local trust manager applies external control issues to the at least one local trusted unit.

15. The method according to claim 1, wherein the local trust manager performs a charging functionality.

16. The method according to claim 1, wherein the at least one local trusted unit is protected against manipulation.

17. The method according to claim 1, wherein the at least one local trusted unit builds a security and/or trust relation based on a process and/or a credential that is controlled by the local trust manager.

18. A device comprising a processor unit that is arranged such that the method according to claim 1 is executable on said processor.

19. A device, comprising:
   a processor unit;
   at least one local trusted unit; and
   a local trust manager;
   wherein the local trust manager is configured to
   receive a request from a second instance, the request comprising a policy or a required level of trust;
   translate a parameter of the at least one local trusted unit into a trust level for the at least one local trusted unit; and
   provide policy related information including the trust level, to the at least one local trusted unit and to the second instance from which the request was received.

20. The device according to claim 19, wherein said device is a communication device, wherein the communication device comprises at least one of:
   a smart card;
   a chip card;
   a user equipment;
   a user terminal;
   a mobile phone;
   a machine setup and left at a location by a user;
   a mobile computer;
   a personal digital assistant;
   a computer connected to a wired or wireless network;
   an IP telephone.

21. A communication system comprising the device according to claim 20.

* * * * *